US012148560B2

(12) United States Patent
Lee et al.

(10) Patent No.: US 12,148,560 B2
(45) Date of Patent: Nov. 19, 2024

(54) COIL COMPONENT

(71) Applicant: SAMSUNG ELECTRO-MECHANICS CO., LTD., Suwon-si (KR)

(72) Inventors: Dong Hwan Lee, Suwon-si (KR); Dong Jin Lee, Suwon-si (KR); Chan Yoon, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 719 days.

(21) Appl. No.: 17/233,240

(22) Filed: Apr. 16, 2021

(65) Prior Publication Data

US 2021/0398737 A1 Dec. 23, 2021

(30) Foreign Application Priority Data

Jun. 18, 2020 (KR) ........................ 10-2020-0074298

(51) Int. Cl.
*H01F 27/28* (2006.01)
*H01F 27/24* (2006.01)

(52) U.S. Cl.
CPC ............. *H01F 27/28* (2013.01); *H01F 27/24* (2013.01)

(58) Field of Classification Search
CPC .... H01F 27/26; H01F 27/292; H01F 27/2847; H01F 3/14; H01F 2003/106;
(Continued)

(56) References Cited

U.S. PATENT DOCUMENTS 9,576,711 B2 2/2017 Yoon et al.
2014/0313003 A1* 10/2014 Liu ...................... H01F 27/292 336/178

(Continued)

FOREIGN PATENT DOCUMENTS

CN 105825995 A 8/2016
CN 105990008 A 10/2016

(Continued)

OTHER PUBLICATIONS

Office Action issued in corresponding Korean Patent Application No. 10-2020-0074298 issued Oct. 1, 2021, with English translation.

(Continued)

*Primary Examiner* — Shawki S Ismail
*Assistant Examiner* — Kazi S Hossain
(74) *Attorney, Agent, or Firm* — MORGAN, LEWIS & BOCKIUS LLP

(57) ABSTRACT

A coil component includes a support substrate, first and second coil units disposed on the support substrate and spaced apart from each other, and a body having a first core and a second core spaced apart from the first core. The first and second coil units include first and second winding portions having at least one turn around the first and second cores, respectively, and first and second extension portions respectively extending from the first and second winding portions, each of the first and second extension portions surrounding the first and second cores. The first and second winding portions are spaced apart from each other in a direction in which the first extension portion extends from the first winding portion.

20 Claims, 6 Drawing Sheets

(58) Field of Classification Search
CPC .... H01F 2027/065; H01F 3/10; H01F 38/023; H01F 27/2852
USPC .................................................. 336/212, 221
See application file for complete search history.

(56) References Cited

U.S. PATENT DOCUMENTS

| | | | | |
|---|---|---|---|---|
| 2016/0078986 | A1* | 3/2016 | Yoon | H01F 5/04 336/83 |
| 2016/0217908 | A1* | 7/2016 | Jeong | H01F 27/292 |
| 2019/0013145 | A1* | 1/2019 | Ohkubo | H01F 17/04 |
| 2019/0043659 | A1 | 2/2019 | Jeong | |
| 2020/0211767 | A1* | 7/2020 | Hou | H01F 27/24 |
| 2021/0134515 | A1 | 5/2021 | Jung et al. | |
| 2021/0225578 | A1 | 7/2021 | Jung et al. | |

FOREIGN PATENT DOCUMENTS

| | | | |
|---|---|---|---|
| CN | 112750592 | A | 5/2021 |
| CN | 113223812 | A | 8/2021 |
| KR | 10-2016-0032580 | A | 3/2016 |
| KR | 10-2016-0092673 | A | 8/2016 |
| KR | 10-2016-0105207 | A | 9/2016 |

OTHER PUBLICATIONS

Office Action issued Nov. 17, 2023 for corresponding Chinese Patent Application No. 202110652797.3 (See English Translation).

* cited by examiner

COIL COMPONENT

CROSS-REFERENCE TO RELATED APPLICATION(S)

This application claims the benefit of priority to Korean Patent Application No. 10-2020-0074298, filed on Jun. 18, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices together with a resistor and a capacitor.

As electronic devices increasingly have high performance and have become compact, electronic components used in electronic devices have increased in number and miniaturized.

Accordingly, demand for a coil component in a coupled form to reduce a mounting area of a component has increased. In order to increase efficiency of components within the same size, a coupling coefficient may be increased by increasing mutual inductance or the coupling coefficient may be appropriately reduced by increasing leakage inductance. That is, the degree of magnetic coupling between coil units of a coupled inductor may be appropriately adjusted by appropriately changing shapes of the coil units according to the needs of those skilled in the art.

Meanwhile, in some cases, a coupling coefficient is adjusted by disposing a plurality of coil units to be spaced apart from each other in various forms within a single coil component. This involves a problem in that the coupling coefficient is difficult to adjust to uniform quality due to variations in terms of manufacturing process of the component. Thus, it may be difficult to effectively adjust inductance characteristics and direct current (DC) resistance characteristics of the component overall.

SUMMARY

An exemplary embodiment is to effectively control the degree of magnetic coupling between coil units in a coupled inductor having a plurality of coil units.

Another exemplary embodiment is to effectively adjust inductance characteristics and DC resistance characteristics in a coupled inductor having a plurality of coil units.

According to an aspect of the present disclosure, a coil component includes: a support substrate; first and second coil units disposed on the support substrate and spaced apart from each other; and a body having a first core and a second core spaced apart from the first core. The first and second coil units include first and second winding portions having at least one turn around the first and second cores, respectively, and first and second extension portions respectively extending from the first and second winding portions, each of the first and second extension portions surrounding the first and second cores. The first and second winding portions are spaced apart from each other in a direction in which the first extension portion extends from the first winding portion.

According to another aspect of the present disclosure, a coil component includes: a support substrate; first and second coil units disposed on the support substrate and spaced apart from each other; and a body having a first core and a second core spaced apart from the first core. The first coil unit includes a first winding portion having at least one turn around the first core, a first extension portion extending from the first winding portion and surrounding the first and second cores, and a first lead portion connected to the first extension portion and exposed to a first side surface of the body. The second coil unit includes a second winding portion having at least one turn around the second core, a second extension portion extending from the second winding portion and surrounding the first and second cores, and a second lead portion connected to the second extension portion and exposed to a second side surface of the body. The first and second side surfaces of the body oppose each other in a second direction perpendicular to the first direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
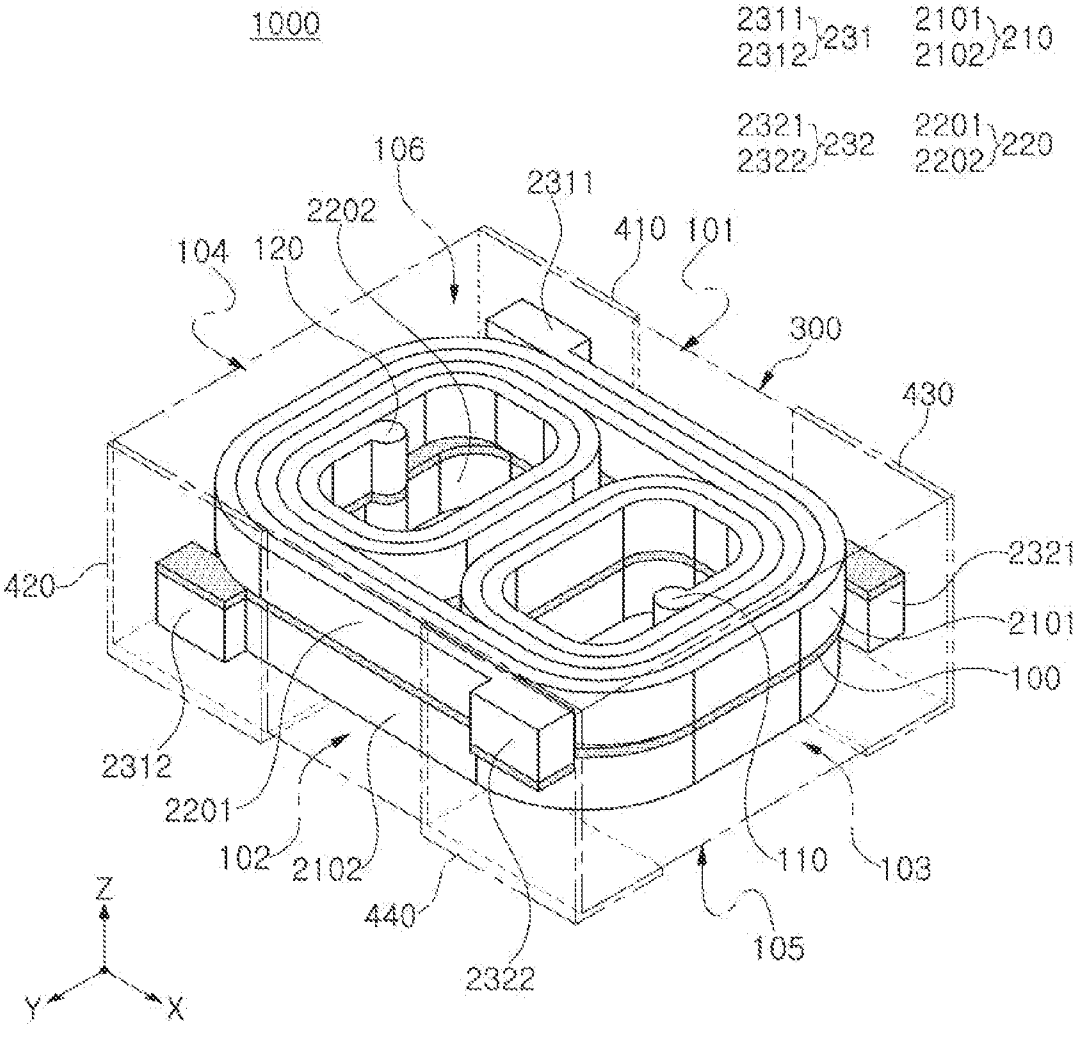
FIG. 1 is a side perspective view schematically illustrating a coil component according to an exemplary embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or exemplary embodiment, e.g., as to what an example or exemplary embodiment may include or implement, means that at least an example or exemplary embodiment exists in which such a feature is included or implemented while all examples and exemplary embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of the present application.

Sizes and thicknesses of each component shown in the drawings are arbitrarily shown for convenience of description, so the present disclosure is not necessarily limited thereto.

In the drawings, an X direction may be defined as a first direction or a length direction, a Y direction may be defined as a second direction or a width direction, and a Z direction may be defined as a third direction or a thickness direction.

Hereinafter, a coil component according to an exemplary embodiment in the present disclosure will be described in detail with reference to the accompanying drawings, and in the description with reference to the accompanying drawings, the same or corresponding components are given the same reference numerals and redundant descriptions thereof will be omitted.

Various types of electronic components are used in electronic devices, and various types of coil components may be appropriately used between the electronic components for the purpose of removing noise.

That is, in an electronic device, a coil component may be used as a power inductor, a high frequency (HF) inductor, a general bead, a high frequency (GHz) bead, a common mode filter, and the like.

Exemplary Embodiment of Present Disclosure

Figure 2:
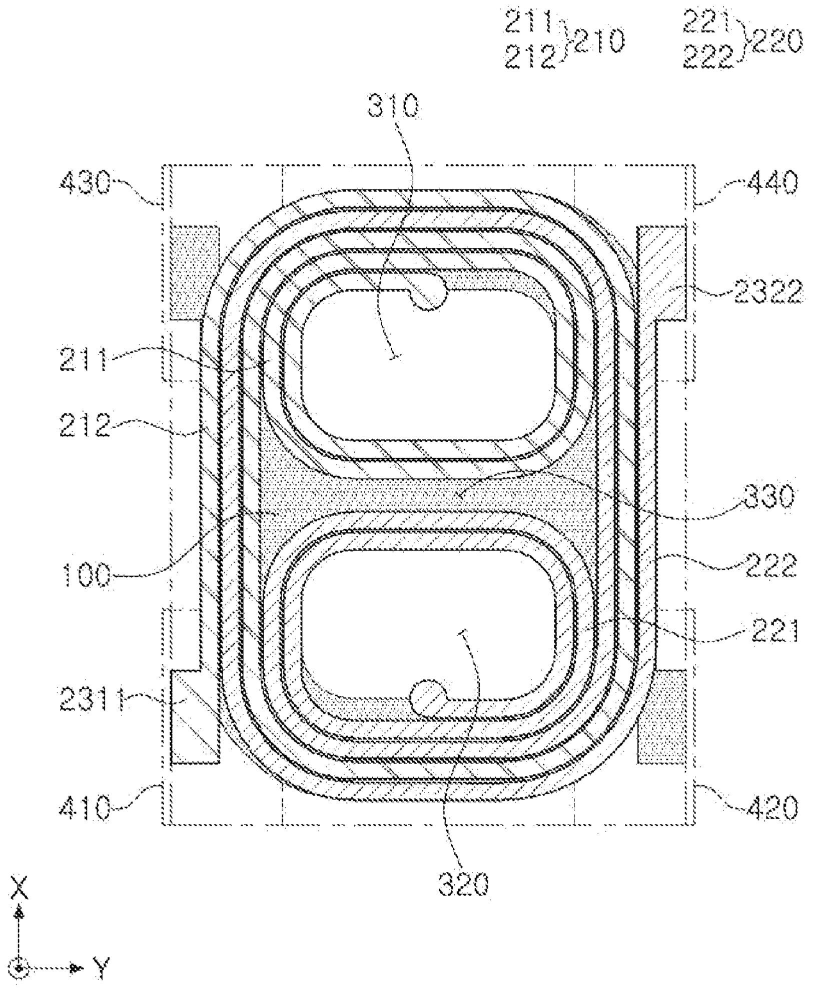
FIG. 2 is a top view of the coil component of FIG. 1.
Figure 3:
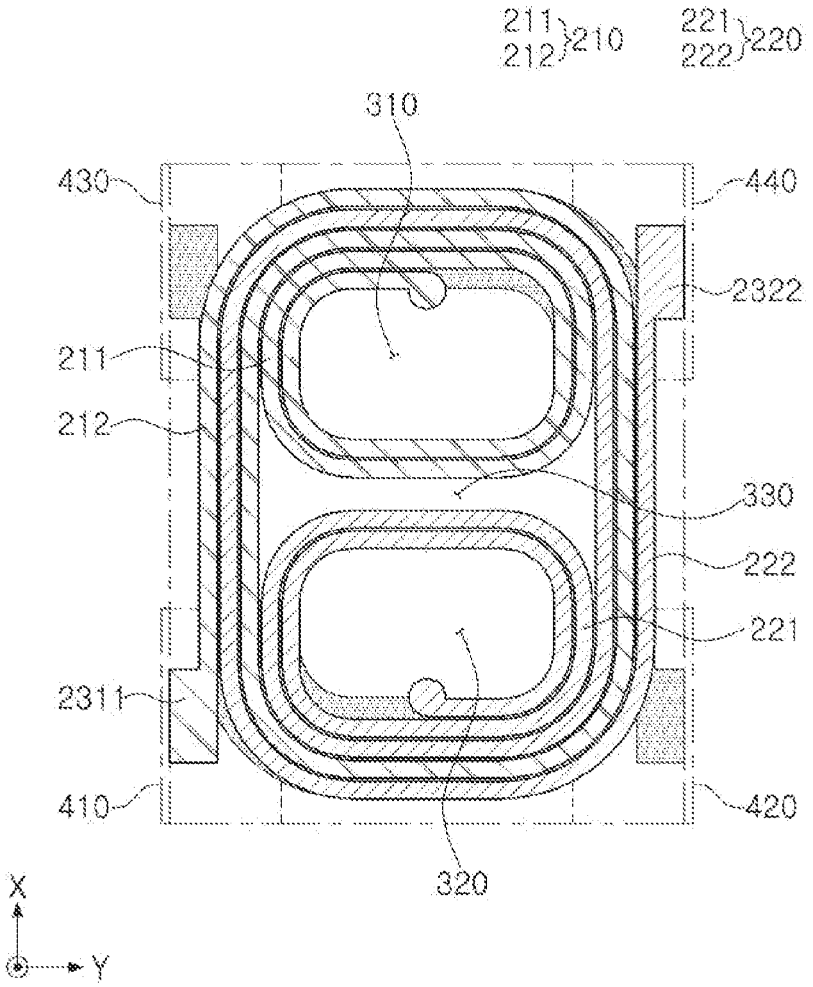
FIG. 3 is a top view of the coil component of FIG. 1, corresponding to FIG. 2.
Figure 5:
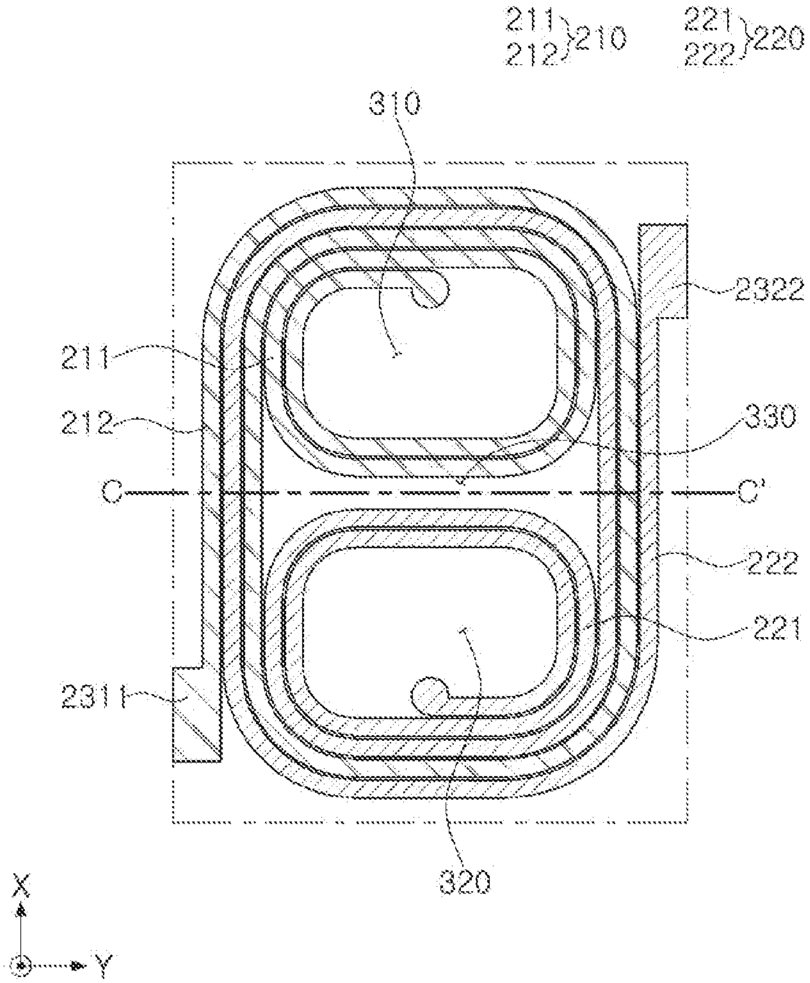
FIG. 5 is a view illustrating a first coil pattern and a third coil pattern of FIG. 1.
Figure 6:
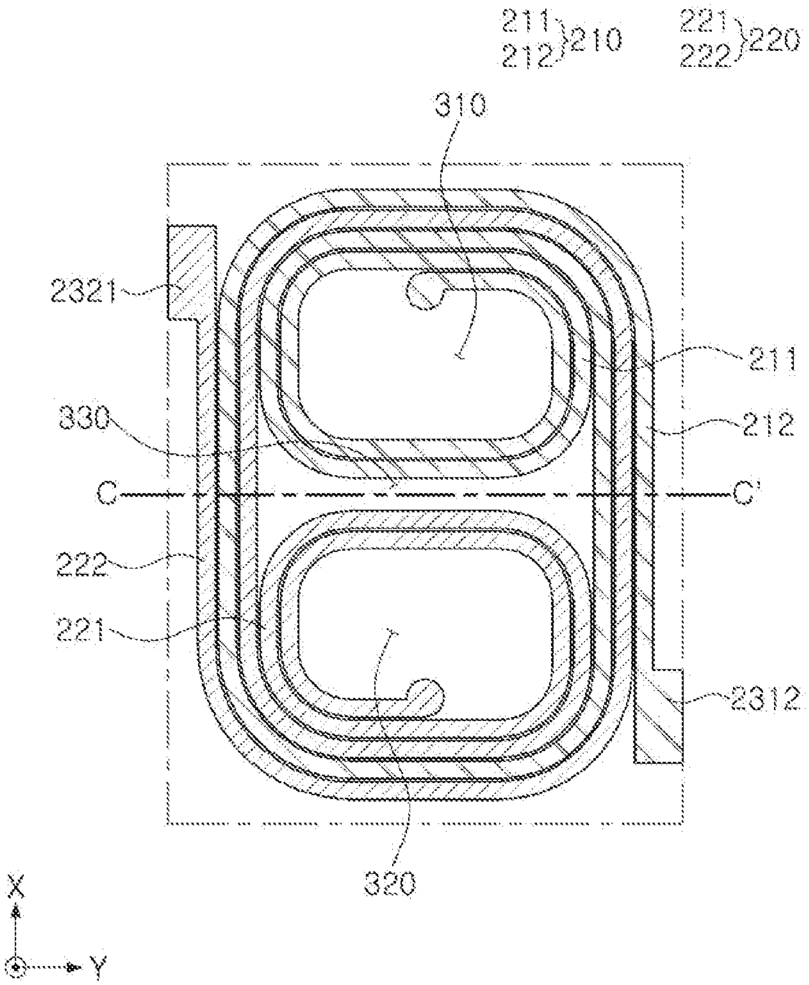
FIG. 6 is a view illustrating a second coil pattern and a fourth coil pattern of FIG. 1.

FIG. 1 is a side perspective view schematically illustrating a coil component according to an exemplary embodiment in the present disclosure. FIG. 2 is a top view of the coil component of FIG. 1. FIG. 3 is a top view of the coil component of FIG. 1, corresponding to FIG. 2. FIG. is a top view of the coil component of FIG. 1, corresponding to FIG. 2. FIG. 5 is a view illustrating a first coil pattern and a third coil pattern of FIG. 1. FIG. 6 is a view illustrating a second coil pattern and a fourth coil pattern of FIG. 1.

Referring to FIGS. 1 through 6, a coil component 1000 according to the present exemplary embodiment may include a support substrate 100, first and second coil units 210 and 220, and a body 300.

The support substrate 100 is embedded in the body 300 to be described later and disposed inside the body 300. The support substrate 100 includes one surface and the other surface facing the one surface and supports the first and second coil units 210 and 220 to be described later.

The support substrate 100 may be formed of an insulating material including a thermosetting insulating resin such as an epoxy resin, a thermoplastic insulating resin such as polyimide, or a photosensitive insulating resin or may be formed of an insulating material prepared by impregnating a reinforcing material such as glass fiber or inorganic filler in this insulating resin. As an example, the support substrate 200 may be formed of insulating materials such as prepreg, Ajinomoto build-up film (ABF), FR-4, a bismaleimide triazine (BT) resin, photo imageable dielectric (PID), etc., but is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 100 is formed of an insulating material including a reinforcing material, the support substrate 100 may provide more excellent rigidity. If the support substrate 100 is formed of an insulating material that does not contain glass fibers, the support substrate 200 is advantageous in reducing a thickness of the entirety of the first and second coil units 210 and 220. In addition, when the support substrate 100 is formed of an insulating material including a photosensitive insulating resin, the number of processes for forming the first and second coil units 210 and 220 may be reduced, which is advantageous in reducing production cost and forming fine vias.

The body 300 forms the exterior of the coil component 1000 according to the present exemplary embodiment and includes the first and second coil units 210 and 220 embedded therein.

The body 300 may have a hexahedral shape as a whole.

The body 300 includes a first surface 101 and a second surface 102 opposing each other in the width direction Y, a third surface 103 and a fourth surface 104 opposing each other in the length direction X, and a fifth surface 105 and a sixth surface 106 opposing each other in the thickness direction Z. In the present exemplary embodiment, the fifth surface 105 and the sixth surface 106 of the body 300 may refer to one surface and the other surface of the body 300, respectively, and the first surface 101 and the second surface 102 may refer to one side surface and the other side surface of the body 300, respectively.

The body 300 includes first and second cores 310 and 320 penetrating the first and second coil units 210 and 220 and spaced apart from each other, respectively, as will be described later. The first and second cores 310 and 320 may be formed by filling through-holes of the first and second coil units 210 and 220 with a magnetic composite sheet, but are not limited thereto.

The body 300 further has a spacing portion 330 disposed between the first and second winding portions 211 and 221 and between first and second extension portions 212 and 222 to be described later. The spacing portion 330 may be integrally surrounded by the first winding portion 211, the first extension portion 212, the second winding portion 221, and the second extension portion 222. That is, the spacing portion 330 refers to a space between the plurality of coil units 210 and 220 in a coupled inductor in which a plurality of coil units are arranged in various forms within one coil component. As described later, the spacing portion 330 refer to a region surrounded by the innermost turn of the first extension portion 212, the innermost turn of the first extension portion 212, the innermost turn of the second winding portion 221, and the innermost turn of the second extension portion 222.

The body 300 may include a magnetic material and a resin. Specifically, the body 300 may be formed by stacking one or more magnetic composite sheets including a resin and a magnetic material dispersed in the resin. However, the body 300 may have a structure other than the structure in which a magnetic material is dispersed in a resin. For example, the body 300 may be formed of a magnetic material such as ferrite.

The magnetic material may be ferrite or a magnetic metal powder.

The ferrite powder may be formed of at least one of, for example, spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrites such as Ba—Zn-based ferrite, Ba—Mg-based ferrite, Ba—Ni-based ferrite, Ba—Co-based ferrite, or Ba—Ni—Co-based ferrite, garnet type ferrite such as Y-based ferrite, and Li-based ferrite.

Magnetic metal powder may include at least any one selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si alloy powder, Fe—Si—Cu—Nb-based alloy powder, Fe—Ni—Cr-based alloy powder, and Fe—Cr—Al-based alloy powder.

The magnetic metal powder may be amorphous or crystalline. For example, the magnetic metal powder may be Fe—Si—B—Cr-based amorphous alloy powder, but is not limited thereto.

Ferrite and the magnetic metal powder may have an average diameter of about 0.1 μm to 30 μm, but is not limited thereto.

The body 300 may include two or more types of magnetic materials dispersed in a resin. Here, the different types of magnetic materials refer to that magnetic materials dispersed in a resin are distinguished from each other by any one of an average diameter, a composition, crystallinity, and a shape.

The resin may include, but is not limited to, epoxy, polyimide, liquid crystal polymer, and the like alone or in combination.

The first and second coil units 210 and 220 are disposed to be spaced apart from each other on the support substrate 100 to manifest characteristics of the coil component.

The first and second coil units 210 and 220 applied to the present exemplary embodiment include the first and second winding portions 211 and 221, the first and second extension portions 212 and 222, first to fourth coil patterns 2101, 2102, 2201, and 2202, and first and second lead portions 231 and 232.

In the present exemplary embodiment, the first and second coil units 210 and 220 include the first and second winding portions 211 and 221 having at least one turn around the first and second cores 310 and 320 and first and second extension portions 212 and 222 extending from the first and second winding portions 211 and 221 to surround the first and second cores 310 and 320 respectively. In the present exemplary embodiment, the first and second coil units 210 and 220 may have the innermost turn disposed adjacent to the center of the spacing portion 330 and an outermost turn disposed adjacent to the surface of the body 100. Accordingly, the first and second winding portions 211 and 221 and the first and second extension portions 212 and 222 may also have the innermost turn and the outermost turn, respectively. In addition, the first and second coil units 210 and 220 may further have an intermediate turn disposed between the innermost turn and the outermost turn. Referring to FIGS. 5 and 6, the first extension portion 212 connects the first lead portion 231 and the first winding portion 211 to surround both the first and second winding portions 211 and 221. The second extension portion 222 connects the second lead portion 232 and the second winding portion 221 to surround both the first and second winding portions 211 and 221. Referring to FIGS. 5 and 6, a center line C-C' is an arbitrary reference line parallel to the width direction Y of the body 300 and passing through the center of the spacing portion 330. That is, the first extension portion 212 refers to a portion of the coil units 210 and 220 wound to sequentially surround the first and second winding portions 211 and 221 from the first lead portion 231 to be described later to reach the center line C-C'. The second extension portion 222 refers to a region of the coil units 210 and 220 wound to sequentially surround the second and first winding portions 221 and 211 from the second lead portion 232 to be described later to reach the center line C-C'. As a result, the first extension portion 212 wound to sequentially surround the first and second winding portions 211 and 221 and the second extension portion 222 wound to sequentially surround the second and first winding portions 221 and 211 may be alternately disposed with each other.

Referring to FIGS. 5 and 6, the first and second coil units 210 and 220 include the first coil pattern 2101 disposed on one surface of the support substrate 100 and the second coil pattern 2102 disposed on the other surface of the support substrate 100 and facing the first coil pattern 2101. In addition, the first and second coil units 210 and 220 include the third coil pattern 2201 disposed on the other surface of the support substrate 100 and the fourth coil pattern 2202 disposed on one surface of the support substrate 100 and facing the third coil pattern 2201. Although not specifically shown, a distance between the first winding portion 211 and the second winding portion 221 may be greater than or equal to a line width of each of the first to fourth coil patterns 2101, 2102, 2201, and 2202. In addition, with reference to the length direction X of the body 100, the distance between the first winding portion 211 and the second winding portion 221 may be smaller than lengths of the first and second cores 310 and 320. Meanwhile, in the present exemplary embodiment, the distance between the first winding portion 211 and the second winding portion 221 is not particularly limited if a target component is to be manufactured by appropriately adjusting the degree of magnetic coupling between the coil units 210 and 220, inductance, and DC resistance characteristics.

Referring to FIGS. 1 through 5 and 6, the first coil unit 210 further includes a first lead portion 231 exposed to the first surface 101 and the second surface 102 of the body 300, and the second coil unit 220 further includes a second lead portion 232 exposed to the first surface 101 and the second surface 102 of the body 300. Referring to FIGS. 5 and 6, the first extension portion 211 connects the first coil unit 210 and the first lead portion 231, and the second extension portion 222 connects the second coil unit 220 and the second lead portion 232. The first extension portion 212 connects the first lead portion 232 and the first winding portion 211 to surround the second winding portion 221, and the second extension portion 222 connects the second lead portion 232 and the second winding portion 221 to surround the first winding portion 211. Also, the first lead portion 231 includes first and second lead patterns 2311 and 2312 exposed to be spaced apart from each other on the first surface 101 of the body 300, and the second lead portion 232 includes third and fourth lead patterns 2321 and 2322 exposed to be spaced apart from each other on the second surface 102 of the body 300.

The first and second coil patterns 2101 and 2102 and the third and fourth coil patterns 2201 and 2202 may be connected by first and second vias 110 and 120, respectively.

The coil units 210 and 220 and the vias 110 and 120 may include at least one conductive layer.

As an example, when the first and second coil units 210 and 220 and the first and second vias 110 and 120 are formed on one surface of the support substrate 100 by plating, the first and second coil units 210 and 220 and the first and second vias 110 and 120 may each include a seed layer such as an electroless plating layer and an electroplating layer. Here, the electroplating layer may have a single layer structure or a multilayer structure. The electroplating layer having a multilayer structure may have a conformal film structure in which one electroplating layer is covered by the other electroplating layer or may be formed such that the other electroplating layer is stacked on only one surface of one electroplating layer. The seed layers of the first and second coil units 210 and 220 and the seed layers of the first and second vias 110 and 120 may be integrally formed so that a boundary may not be formed therebetween, but is not limited thereto. The electroplating layer of the first and second coil units 210 and 220 and the electroplating layer of the first and second vias 110 and 120 may be formed as a single body so that a boundary may not be formed therebetween, but is not limited thereto.

Each of the first and second coil units 210 and 220 and the vias 110 and 120 may be formed of copper (Cu), aluminum (Al), silver (Ag), tin (Sn), gold (Au), nickel (Ni), lead (Pb), titanium (Ti), or alloys thereof, but is not limited thereto.

In the related art coil component, a coupling coefficient may be adjusted by disposing a plurality of coil units to be spaced apart in various forms in some cases. This involves a problem in that it is difficult to adjust the coupling coefficient with uniform quality due to variations in a manufacturing process of the component. This problem may be further aggravated in a coupled inductor in which a plurality of coil units is spaced apart in the thickness direction of the body. As a result, it may be difficult to effectively control inductance characteristics and DC resistance characteristics of the entire component as well. Meanwhile, in the present exemplary embodiment, since the extension portions 212 and 222 and the winding portions 211 and 221 are arranged on the same plane, the degree of magnetic coupling between the plurality of coil units may be more uniformly adjusted. Referring to FIGS. 1 and 2, the first and second winding portions 211 and 221 are spaced apart from each other in a direction in which the first extension portion 212 extends from the first winding portion 211. That is, the first and second winding portions 211 and 221 are spaced apart from each other in the length direction X of the body 100. The first and second winding portions 211 and 221 may be surrounded by both the first and second extension portions 212 and 222 on the same plane parallel to the support substrate 100. As a result, compared to the case in which the plurality of coil units are spaced apart in the thickness direction Z of the body 100, a coupling coefficient between the first and second coil units 210 and 220 may be more uniformly adjusted.

Referring to FIG. 2, the support substrate 100 may remain at the center of the space portion 330. That is, the support substrate 100 may remain as a process of trimming the support substrate 100 disposed on the space portion 330 is omitted. As a result, an insulating material may be included in a region surrounded by the innermost turn of the first winding portion 211, the innermost turn of the first extension portion 212, the innermost turn of the second winding portion 221, and the innermost turn of the second extension portion 222 in the region between the first and second coil units 210 and 220.

Referring to FIG. 3, the support substrate 100 may not remain at the center of the space portion 330. That is, the process of trimming the support substrate 100 disposed on the space portion 330 may be added. In this case, a magnetic material is included in the region surrounded by the innermost turn of the first winding portion 211, the innermost turn of the first extension portion 212, the innermost turn of the second winding portion 221, and the innermost turn of the second extension portion 222. As a result, since more magnetic material may be included in the space portion 330, inductance characteristics may be improved.

Figure 4:
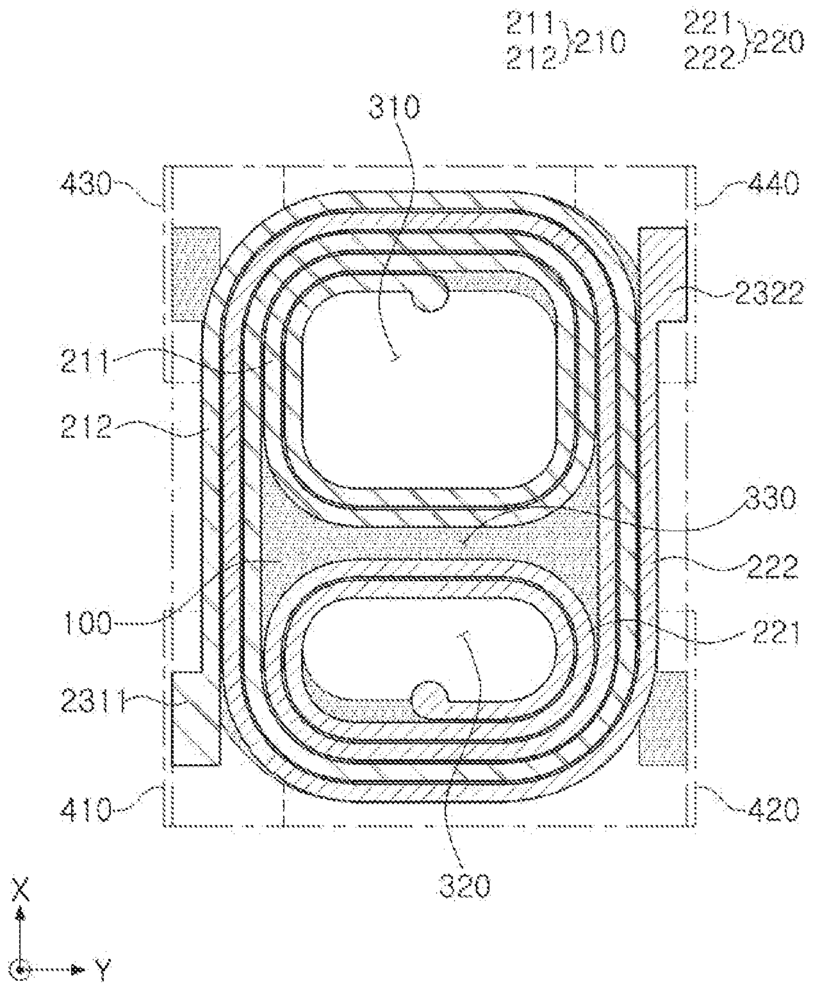
FIG. 4 is a top view of the coil component of FIG. 1, corresponding to FIG. 2.

Referring to FIG. 4, a volume of the first core 310 may be different from a volume of the second core 320. For example, the distance between inner circumferential surfaces of the first winding portion 211 in the length direction X may be different from the distance between inner circumferential surfaces of the second winding portion 221 in the length direction X. In addition, referring to FIG. 4, a length of a path formed by the second winding portion 221 along coil turns thereof may be shorter than a length of a path formed by the second extension portion 222 along coil turns thereof. That is, the volume of the first and second cores 310 and 320 may be adjusted by making the length of the path formed by the second winding portion 221 shorter than the length of the path formed by the second extension portion 222. Referring to FIG. 4, since the length of the path formed by the second extension portion 222 is relatively increased than the length of the path formed by the second winding portion 221, the degree of magnetic coupling between the first and second coil units 210 and 220 is relatively increased. In addition, although not specifically shown, the axis of the first and second cores 310 and 320 may be shifted in a direction in which the first extension portion 212 extends from the first winding portion 211, compared to a case in which the first and second cores 310 and 320 have the same volume.

In one exemplary embodiment, a distance between the first winding portion 211 and the second winding portion 221 may be shorter than a length of the first core 310 or the second core 320 with reference to the length direction X.

In the present exemplary embodiment, as the space portion 330 is disposed between the first and second winding portions 211 and 221 and between the first and second extension portions 212 and 222, an absolute value of the coupling coefficient may increase but inductance characteristics may be reduced as the volume of the coil units 210 and 220 decreases. In this case, the inductance characteristics may be improved by increasing the thickness of each of the first to fourth coil patterns 2101, 2102, 2201, and 2202 than those of the related art. At the same time, by increasing the thickness of each of the first to fourth coil patterns 2101, 2102, 2201, and 2202 than those of the related art, DC resistance characteristics may be improved, thereby improving characteristics of the entire coil component. That is, deterioration in inductance characteristics or deterioration in DC resistance characteristics due to the increase in the absolute value of the coupling coefficient through adjustment of the volumes of the first and second cores 310 and 320 may be supplemented. As a result, the degree of magnetic coupling of the coil units 210 and 220, inductance characteristics, and DC resistance characteristics may be appropriately adjusted. Meanwhile, although not specifically shown, the length of the path formed by the first winding portion 211 may be shorter than the length of the path formed by the first extension portion 212. Further, although not specifically shown, the length of the path formed by the first winding portion 211 may be substantially equal to the length of the path formed by the first extension portion 212. In addition, the length of the path formed by the second winding portion 221 may be substantially equal to the length of the path formed by the second extension portion 222. That is, in the present exemplary embodiment, the length of the path formed by the winding portion and the length of the path formed by the extension portion may not be particularly limited, if the degree of magnetic coupling of the coil units 210 and 220, inductance characteristics, and DC resistance characteristics are to be appropriately adjusted. In addition, in the present exemplary embodiment, for convenience of explanation, only the lengths of the paths formed by the second winding portion 221 and the second extension portion 222 have been described, but the description thereof may also be applied to the lengths of the paths formed by the first winding portion 211 and the first extension portion 212 in the same manner.

One or ordinary skill in the art would understand that the expression "substantially equal" refers to being equal by allowing process errors, positional deviations, and/or measurement errors that may occur in a manufacturing process.

The first to fourth external electrodes 410, 420, 430, and 440 may be disposed outside the body 300 and connected to the first and second lead portions 231 and 232. Referring to FIG. 1, first and second external electrodes 410 and 420 are disposed outside the body 300 and connected to the first lead portions 231, respectively, and third and fourth external electrodes 430 and 440 are disposed outside the body 300 and connected to the second lead portions 232, respectively. Specifically, the first and second external electrodes 410 and 420 are connected to the first and second lead patterns 2311 and 2312 disposed on the first surface 101 of the body 300, respectively, and the third and fourth external electrodes 430 and 440 are connected to the third and fourth lead patterns 2321 and 2322 disposed on the second surface 102 of the body 300, respectively.

In the present exemplary embodiment, the first to fourth external electrodes 410, 420, 430, and 440 may be formed by first forming an insulating layer (not shown) on a surface of the body 300 excluding regions in which the first to fourth external electrodes 410, 420, 430, and 440 are to be formed and subsequently disposing the first to fourth external electrodes 410, 420, 430, and 440 in the regions excluding the region in which the insulating layer (not shown) is disposed.

The first to fourth external electrodes 410, 420, 430, and 440 may be formed using a paste containing a metal having excellent electrical conductivity, for example, a conductive paste including nickel (Ni), copper (Cu), tin (Sn), or silver (Ag) alone or alloys thereof. In addition, a plating layer may be further formed on each of the first to fourth external electrodes 410, 420, 430, and 440. In this case, the plating layer may include one or more selected from the group consisting of nickel (Ni), copper (Cu), and tin (Sn). For example, a nickel (Ni) layer and a tin (Sn) layer may be sequentially formed.

As set forth above, according to an exemplary embodiment, the degree of magnetic coupling between the coil units may be effectively controlled in the coupled inductor having a plurality of coil units.

According to an exemplary embodiment, inductance characteristics and DC resistance characteristics may be effectively adjusted in the coupled inductor having a plurality of coil units.

While example exemplary embodiments have been shown and described above, it will be apparent to those skilled in the art that modifications and variations could be made without departing from the scope of the present disclosure as defined by the appended claims.

What is claimed is:

1. A coil component comprising:
a support substrate;
first and second coil units disposed on the support substrate and spaced apart from each other; and
a body having a first core and a second core spaced apart from the first core,
wherein the first and second coil units include first and second winding portions having at least one turn around the first and second cores, respectively, and first and second extension portions respectively extending from the first and second winding portions, each of the first and second extension portions surrounding the first and second cores, the first and second winding portions are spaced apart from each other in a first direction in which the first extension portion extends from the first winding portion, the body and the support substrate include different materials from each other, and a distance between inner circumferential surfaces of the first winding portion in the first direction is different from a distance between inner circumferential surfaces of the second winding portion in the first direction, the first and second winding portions being disposed on the same surface of the support substrate.

2. The coil component of claim 1, wherein the body further has a space portion disposed between the first and second winding portions and between the first and second extension portions.

3. The coil component of claim 2, wherein the space portion is integrally surrounded by the first winding portion, the first extension portion, the second winding portion, and the second extension portion.

4. The coil component of claim 3, wherein the space portion includes a magnetic material.

5. The coil component of claim 1, wherein a volume of the first core is different from a volume of the second core.

6. The coil component of claim 1, wherein a length of a path formed by the first winding portion is shorter than a length of a path formed by the first extension portion.

7. The coil component of claim 1, wherein a length of a path formed by the first winding portion is substantially equal to a length of a path formed by the first extension portion.

8. The coil component of claim 1, wherein a length of a path formed by the second winding portion is shorter than a length of a path formed by the second extension portion.

9. The coil component of claim 1, wherein the support substrate includes a first surface and a second surface facing each other, the first coil unit further includes a first coil pattern disposed on the first surface of the support substrate and a second coil pattern disposed on the second surface of the support substrate and disposed to face the first coil pattern, and the second coil unit further includes a third coil pattern disposed on the second surface of the support substrate and a fourth coil pattern disposed on the first surface of the support substrate and disposed to face the third coil pattern.

10. The coil component of claim 9, wherein a distance between the first winding portion and the second winding portion is greater than or equal to a line width of each of the first to fourth coil patterns.

11. The coil component of claim 1, wherein a distance between the first winding portion and the second winding portion is shorter than a length of the first core or the second core with reference to a length direction of the body.

12. The coil component of claim 1, wherein the body includes a first surface and a second surface facing each other and a first side surface and a second side surface connecting the first surface to the second surface and facing each other, and each of the first and second coil units further includes first and second lead portions exposed to the first side surface and the second side surface of the body, respectively.

13. The coil component of claim 12, wherein the first extension portion connects the first lead portion to the first winding portion and surrounds both of the first and second winding portions, and the second extension portion connects the second lead portion to the second winding portion and surrounds both of the first and second winding portions.

14. The coil component of claim 12, wherein the first lead portion includes first and second lead patterns exposed to the first side surface of the body and the second side surface of the body, respectively, and spaced apart from each other, and the second lead portion includes third and fourth lead patterns exposed to the first side surface of the body and the second side surface of the body, respectively, and spaced apart from each other.

15. A coil component comprising:

a support substrate;

first and second coil units disposed on the support substrate and spaced apart from each other; and a body having a first core and a second core spaced apart from the first core in a first direction, wherein the first coil unit includes a first winding portion having at least one turn around the first core, a first extension portion extending from the first winding portion and surrounding the first and second cores, and a first lead portion connected to the first extension portion and exposed to a first side surface of the body, the second coil unit includes a second winding portion having at least one turn around the second core, a second extension portion extending from the second winding portion and surrounding the first and second cores, and a second lead portion connected to the second extension portion and exposed to a second side surface of the body, the first and second side surfaces of the body oppose each other in a second direction perpendicular to the first direction, and a distance between inner circumferential surfaces of the first winding portion in the first direction is different from a distance between inner circumferential surfaces of the second winding portion in the first direction, the first and second winding portions being disposed on the same surface of the support substrate.

16. The coil component of claim 15, wherein the first and second winding portions are spaced apart from each other in the first direction.

17. The coil component of claim 16, wherein a distance between the first winding portion and the second winding portion is greater than or equal to a line width of each of the first and second coil units.

18. The coil component of claim 15, wherein a length of a path formed by the first winding portion is shorter than a length of a path formed by the first extension portion.

19. The coil component of claim 15, wherein a length of a path formed by the first winding portion is substantially equal to a length of a path formed by the first extension portion.

20. The coil component of claim 15, wherein a length of a path formed by the second winding portion is shorter than a length of a path formed by the second extension portion.

* * * * *